(12) United States Patent
Reed

(10) Patent No.: US 11,231,303 B2
(45) Date of Patent: Jan. 25, 2022

(54) TEST LEAD ATTACHMENT ASSEMBLY FOR METAL PIPES

(71) Applicant: Bryan Reed, Camp Verde, AZ (US)

(72) Inventor: Bryan Reed, Camp Verde, AZ (US)

(73) Assignee: ACCURATE CORROSION CONTROL, INC., Glendale, AZ (US)

( * ) Notice: Subject to any disclaimer, the term of this patent is extended or adjusted under 35 U.S.C. 154(b) by 0 days.

(21) Appl. No.: 17/184,893

(22) Filed: Feb. 25, 2021

(65) Prior Publication Data

US 2021/0262836 A1 Aug. 26, 2021

Related U.S. Application Data

(60) Provisional application No. 62/981,318, filed on Feb. 25, 2020.

(51) Int. Cl.
*G01D 11/24* (2006.01)
*G01N 17/04* (2006.01)
*G01N 17/00* (2006.01)

(52) U.S. Cl.
CPC ......... *G01D 11/245* (2013.01); *G01N 17/006* (2013.01); *G01N 17/046* (2013.01)

(58) Field of Classification Search
CPC .... G01D 11/24; G01D 11/245; G01N 17/006; G01N 17/046
See application file for complete search history.

(56) References Cited

U.S. PATENT DOCUMENTS

| | | | | |
|---|---|---|---|---|
| 3,735,249 A | * | 5/1973 | Stoll | G01V 3/15 324/348 |
| 4,151,458 A | * | 4/1979 | Seager | G01N 17/02 324/329 |
| 4,228,399 A | * | 10/1980 | Rizzo | G01R 19/10 324/425 |
| 4,322,805 A | * | 3/1982 | Rog | C23F 13/04 702/59 |
| 4,388,594 A | * | 6/1983 | Deskins | C23F 13/04 324/348 |
| 4,438,391 A | * | 3/1984 | Rog | G01B 3/11 242/223 |
| 4,467,274 A | * | 8/1984 | Bushman | G01V 3/082 324/348 |
| 2018/0259487 A1 | * | 9/2018 | Marashdeh | G01M 5/0075 |

FOREIGN PATENT DOCUMENTS

JP 62285345 A * 12/1987

* cited by examiner

*Primary Examiner* — Jamel E Williams
(74) *Attorney, Agent, or Firm* — Parsons & Goltry; Robert Parsons; Michael Goltry

(57) ABSTRACT

A lead attachment assembly for attaching a lead to an outer surface of a metal pipe includes a lead fitting having an inner surface, an outer surface, and opposing ends. At least one magnet is carried by the inner surface of the lead fitting. The end of a lead wire is fixed to the inner surface of the lead fitting. A conductive epoxy applied to the inner surface of the lead fitting contacts the outer surface of the pipe when positioned. The magnets hold the lead fitting in position while the epoxy cures.

18 Claims, 5 Drawing Sheets

TEST LEAD ATTACHMENT ASSEMBLY FOR METAL PIPES

CROSS-REFERENCE TO RELATED APPLICATIONS

This application claims the benefit of U.S. Provisional Patent Application No. 62/981,318, filed 25 Feb. 2021.

FIELD OF THE INVENTION

This invention relates to cathodic testing apparatus.

More particularly, the present invention relates to lead attachments for measurement of potentials.

BACKGROUND OF THE INVENTION

In various industries using buried pipelines, such as the utilities industry, gas and oil industries and the like, testing of buried pipes for corrosion monitoring and determine effectiveness of cathodic protection is essential. Testing of pipes includes, for example, pipe-to-soil potential measurements. Taking potential measurements from pipes requires conductively attaching a lead to the outer surface of the pipe. Conventionally, lead wires are attached using exothermic metallurgical bonding, brazing and the like. While effective, the use of thermal energy can be a hazard in situation where there may be flammable gasses present, such as in a gas line and the like.

Additionally, lead wire attachment often requires a substantial portion of a pipe to be uncovered and accessible. Uncovering a pipe to the extent required is time consuming expensive and can be detrimental to the surrounding environment or interfere with activities such as traffic and the like.

It would be highly advantageous, therefore, to remedy the foregoing and other deficiencies inherent in the prior art.

It is an object of the present invention to provide a test lead attachment assembly for metal pipes which can be installed without thermal energy.

It is another object of the present invention to provide a test lead attachment assembly for metal pipes which can be installed through a keyhole operation.

SUMMARY OF THE INVENTION

Briefly, to achieve the desired objects and advantages of the instant invention, provided is a lead attachment assembly for metal pipes including a lead fitting having an inner surface, an outer surface, and opposing ends. At least one magnet is carried by the inner surface of the lead fitting. An end of a lead wire is fixed to the inner surface of the lead fitting. A conductive epoxy is positioned on the inner surface of the lead fitting for receipt against an outer surface of a pipe.

The lead attachment assembly can also include a placement device. The placement device includes a pole having a handle end and an engagement end. A magnetic element is coupled to the engagement end. A switch is coupled to the pole proximate the handle end to activate and deactivate the magnetic element. When activated, the magnetic element holds the lead attachment assembly at the engagement end of the pole.

Also provided is a method of attaching a lead wire to a pipe. The method includes the steps of providing a metal pipe having an outer surface with a curvature and providing a lead attachment assembly. The lead attachment assembly includes a lead fitting having an inner surface, an outer surface, and opposing ends, at least one magnet is carried by the inner surface of the lead fitting, and a lead wire is fixed to the inner surface of the lead fitting. An uncured conductive epoxy is applied on the inner surface of the lead fitting. The lead attachment assembly is positioned on the outer surface of the pipe with the uncured conductive epoxy contacting the outer surface of the pipe. The lead attachment assembly is magnetically attached to the outer surface of the pipe by contacting the outer surface of the pipe with the at least one magnet. The uncured conductive epoxy can then be allowed to cure while being held in place by the at least one magnet.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
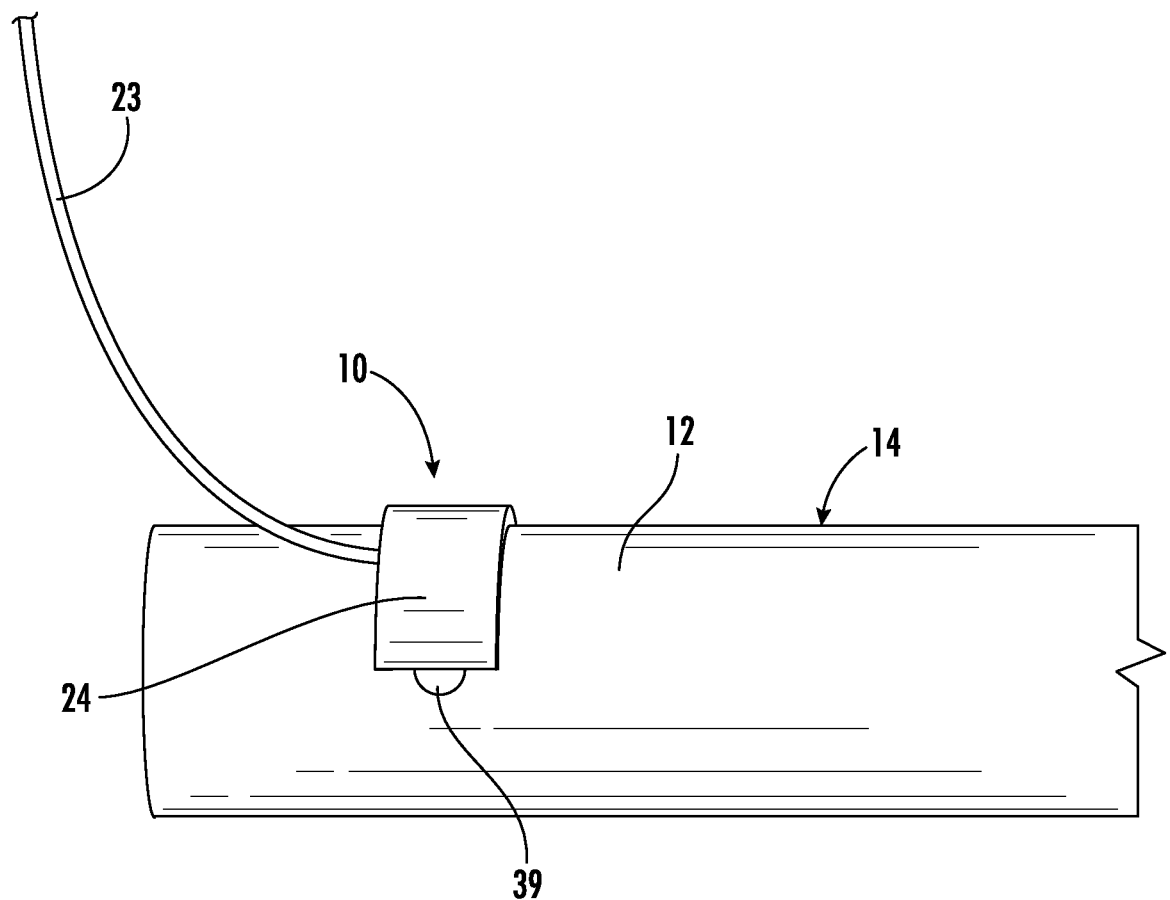
FIG. 1 is a perspective view of a lead attachment assembly according to the present invention, coupled to a pipe.

Turning now to the drawings in which like reference characters indicate corresponding elements throughout the several views, attention is directed to FIG. 1 which illustrates a lead attachment assembly generally designated 10, conductively coupled to an outer surface 12 of a pipe 14. Pipe 14 has a diameter which determines the curvature of the outer surface. As will be described presently, while the curvature of outer surface 12 must be taken into account, any curvature can be accommodated, and therefore lead attachment assembly 12 can be used with any diameter pipe desired. Pipe 14 is formed of a ferromagnetic material, such as steel, iron, various metal alloys and the like.

Figure 2:
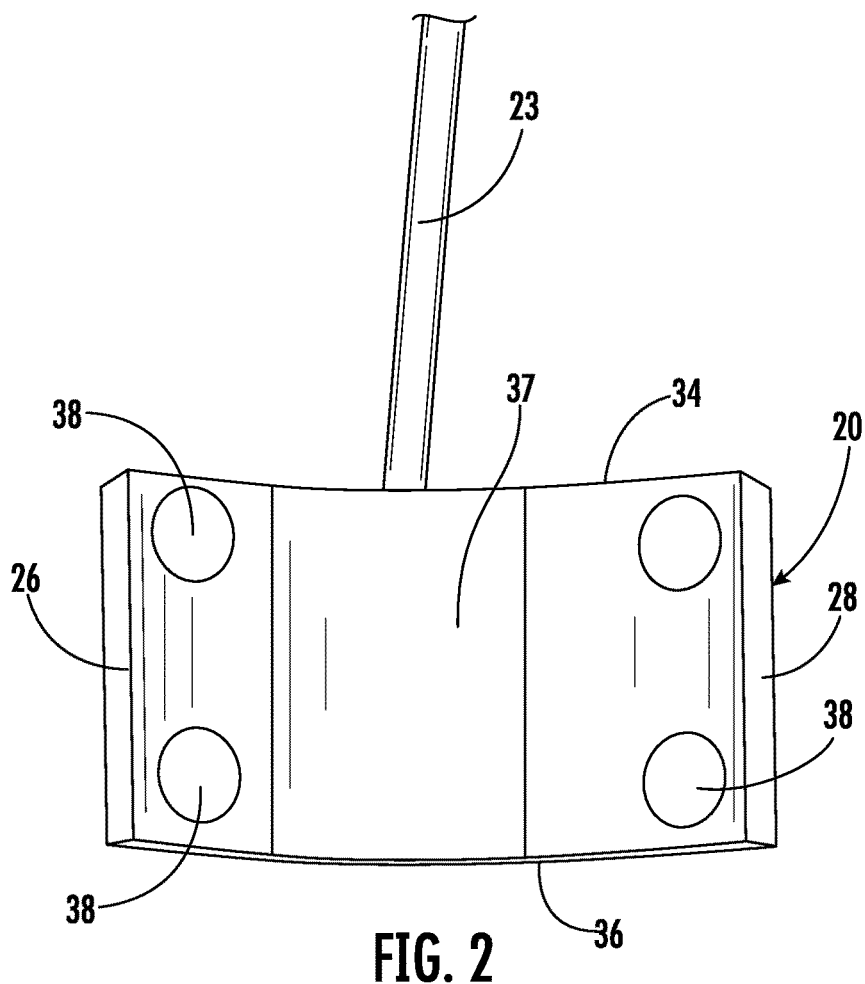
FIG. 2 is a perspective view of a lead attachment assembly according to the present invention.
Figure 3:
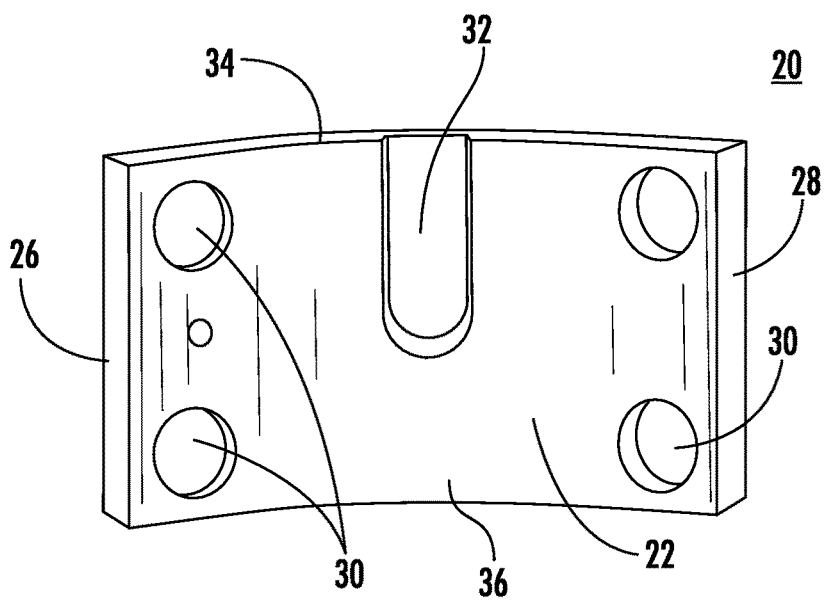
FIG. 3 is a perspective view of a lead fitting according to the present invention.

Still referring to FIG. 1, with additional reference to FIGS. 2 and 3, lead attachment assembly 10 includes a lead fitting 20 to which a lead wire 23 is attached. Referring specifically to FIG. 3, lead fitting 20 includes an inner surface 22, an outer surface 24, and opposing ends 26 and 28. Inner surface 22 of lead fitting 20 is curved between ends 26 and 28 to closely correspond to the curve of outer surface of 12 of pipe 14. There can be some variation in the curve allowing lead fitting 20 to fit to differing diameter pipes as long as the diameter does not vary greatly. Lead fitting 20 also includes magnet receptacles 30 formed proximate ends 26 and 28 (FIG. 3). In this embodiment, two magnet receptacles 30 are formed in inner surface 22 proximate each end 26 and 28. A lead wire receptacle 32 is formed in inner surface 22 of lead fitting 20 intermediate ends 26 and 28. Lead wire receptacle 32 preferable extends from an edge 34 of lead fitting 20 toward an opposing edge 36 thereof.

Referring back to FIG. 2, lead wire 23 is received in lead wire receptacle 32 and soldered to fix it in position. To ensure conductivity, silver solder 37 is preferred, but any conductive solder can be employed. Magnets 38 are received in magnet receptacles 30 and held in position by an adhesive, press fit and the like. While substantially any magnet can be employed, embedding neodymium magnets is preferred.

In use, lead attachment assembly 10 is provided to a location having an exposed pipe. Pipes can be exposed in a variety of manners, digging large openings, or smaller openings often used for what is termed "keyhole operations". While lead attachment assembly 10 can be employed with large openings, they can also be used in keyhole operation, reducing the amount of effort needed to dig a hole to the pipe. Once a portion of the surface of the pipe is exposed, any coating is removed in an area the size of lead fitting 20. An uncured conductive epoxy 39 is placed on inner surface 22 overlying solder 37 between ends 26 and 28. Lead attachment assembly 10 is then placed on outer surface 12 of pipe 14 in the desired position. As inner surface 22 of lead attachment assembly 10 is pressed onto outer surface 12, magnets 38 engage pipe 14 holding lead attachment assembly 10 securely in position. Magnets 38 create pressure between lead attachment assembly 10 and pipe 14, ensuring that uncured conductive epoxy 39, positioned therebetween, will properly cure and securely fix lead attachment assembly 10 to outer surface 12 of pipe 14.

Figure 4:
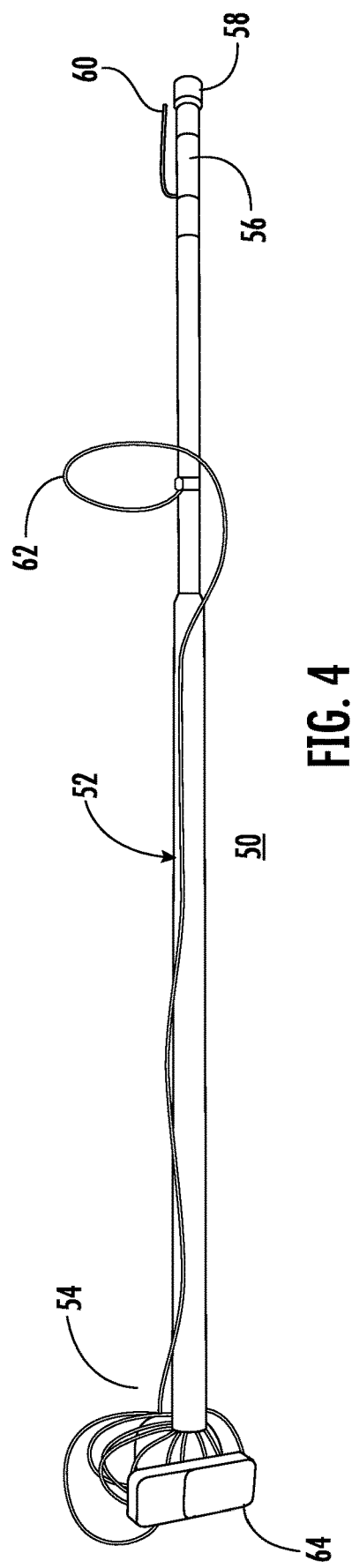
FIG. 4 is a perspective view of a placement device for use with the lead attachment assembly, according to the present invention.

Referring now to FIG. 4, a placement device 50 is illustrated. Placement device 50 includes a telescoping pole 52 allowing for length adjustments, and having a handle end 54 and an engagement end 56. It will be understood that while a telescoping pole is preferred, a fixed length pole can be employed. Placement device 50 also includes a magnetic element 58, which can be an electromagnet or a mechanically rotated magnet, coupled to engagement end 56 and controlled by a switch 59 coupled to pole 52 proximate handle end 54. In use, an individual places the outer surface 24 of lead attachment assembly 10 proximate magnetic element 58 and employs switch 59 to activate magnetic element 58. In the case of an electromagnet, a current is supplied to the electromagnet to actuate a magnetic field. In the case of a mechanical rotated magnet, the magnet is rotated by the switch to provide the proper magnetic pole for attraction of lead attachment assembly 10. When activated, magnetic element 58 holds lead attachment assembly 10 at engagement end 56. The user can then employ pole 52 to place lead attachment assembly 10 over the desired location of outer surface 12 of pipe 14. Once positioned, with conductive epoxy 39 between lead attachment assembly 10 and pipe 14, magnetic element 58 is deactivated and pole 52 is removed, leaving lead attachment assembly 10 attached to pipe 14 by magnets 38. Once conductive epoxy 39 cures, lead attachment assembly 10 is securely fixed to pipe 14.

Still referring to FIG. 4, placement device 50 can also include a camera and light 60 coupled to engagement end 56. A cable 62 extends from camera and light 60 to a viewing screen 64 coupled to pole 52 proximate handle end 54. Camera and light 60 facilitate placement of lead attachment assembly 10 in small dark spaces.

Figure 5:
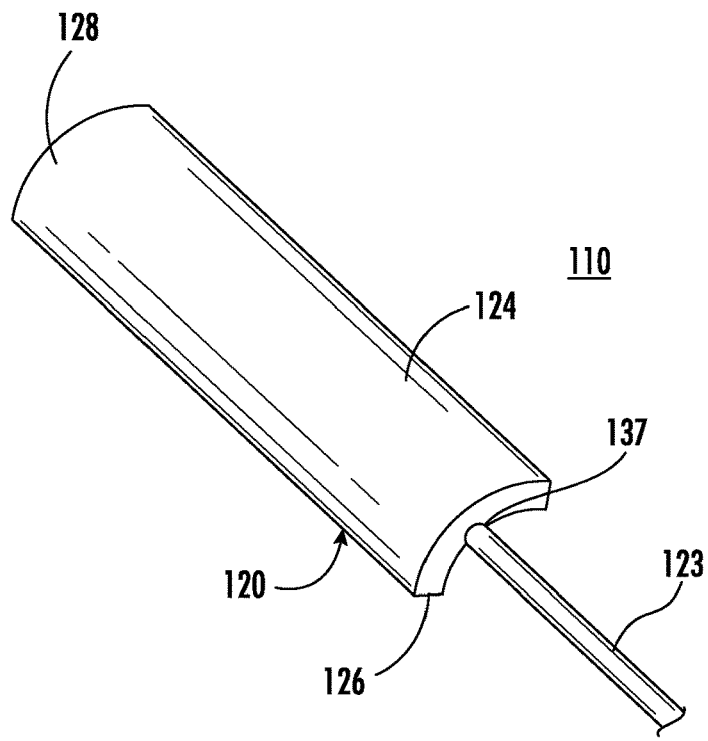
FIG. 5 is a top perspective view of another embodiment of a lead attachment assembly according to the present invention.
Figure 6:
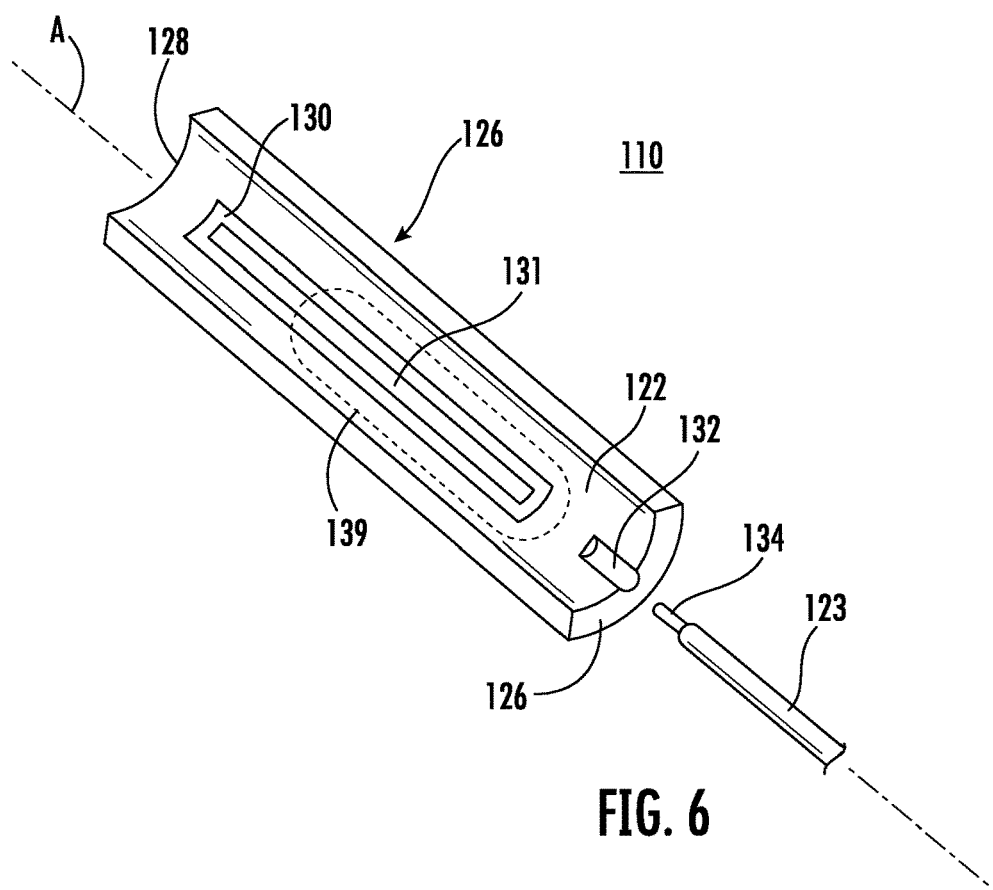
FIG. 6 is a bottom perspective view of the embodiment of the lead attachment assembly of FIG. 5
Figure 7:
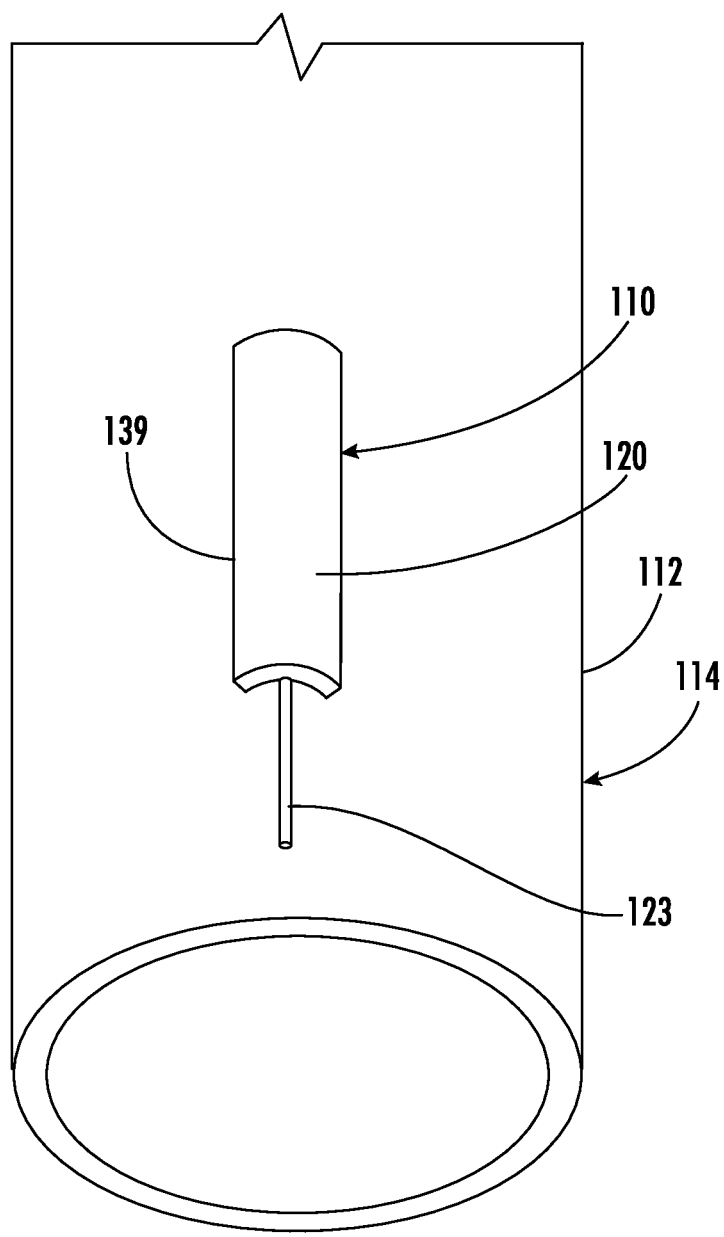
FIG. 7 is a perspective view of the lead attachment assembly of FIGS. 5 and 6 attached to the outer surface of a pipe.

Referring Now to FIGS. 5, 6 and 7, another embodiment of a lead attachment assembly, generally designated 110, is illustrated. Lead attachment assembly 110 is conductively coupled to an outer surface 112 of a pipe 114. In this embodiment, pipe 114 can have substantially any diameter, which determines the curvature of the outer surface, and be used with lead attachment assembly 110, as will be described presently. Pipe 14 is formed of a ferromagnetic material, such as steel, iron, various metal alloys and the like, and is often coated for protection underground. This protective layer is removed at a location to which lead attachment assembly 110 is attached.

Lead attachment assembly 110 includes a lead fitting 120 to which a lead wire 123 is attached. Referring specifically to FIGS. 5 and 6, lead fitting 120 includes an inner surface 122, an outer surface 124, and opposing ends 126 and 128. Inner surface 122 of lead fitting 120 is curved perpendicularly to ends 126 and 128, about a longitudinal axis A. A width, perpendicular to longitudinal axis A, of lead fitting 120 is small enough that the curve provided will allow it to be used on substantially any diameter pipe currently used for municipal services and the like. Lead fitting 120 also includes a magnet receptacle 130 formed in inner surface 122 extending between opposing ends 126 and 128, and spaced therefrom. In this embodiment, a single magnet 131 is employed. However, it will be understood that multiple magnets can be employed. A lead wire receptacle 132 is formed in inner surface 122 of lead fitting 120 at end 126. Lead wire receptacle 132 preferable extends from end 126 toward magnet receptacle 130.

Still referring to FIGS. 5 and 6, and end 134 of lead wire 123 is received in lead wire receptacle 132 and soldered to fix it in position. To ensure conductivity, silver solder 137 is preferred, but any conductive solder can be employed. Thus, lead wire 123 extends from lead fitting 120 generally along longitudinal axis A. Magnet 131 is received in magnet receptacle 130 and preferably held in position by the magnetic attraction between the magnet and lead fitting 120 when formed of ferromagnetic material. However, it will be understood that if lead fitting 120 is formed of a non-ferrous material, the magnet can be fixed in place by an adhesive, press fit and the like. While substantially any magnet can be employed, embedding neodymium magnets is preferred.

In use, lead attachment assembly 110 is coupled to the outer surface 112 of a pipe 114 as described previously with respect to lead attachment assembly 10. Once a portion of the surface of pipe 114 is exposed, any coating is removed in an area the size of lead fitting 120. An uncured conductive epoxy 139 is placed on inner surface 122 overlying magnet 131 between ends 126 and 128. Lead attachment assembly 110 is then placed on outer surface 112 of pipe 114 in the desired position. As inner surface 122 of lead attachment assembly 110 is pressed onto outer surface 112, magnet 131 engages pipe 114 holding lead attachment assembly 110 securely in position. Magnet 131 create pressure between lead attachment assembly 110 and pipe 114, ensuring that uncured conductive epoxy 139, positioned therebetween, will properly cure and securely fix lead attachment assembly 110 to outer surface 112 of pipe 114.

Furthermore, placement device 50 can also be employed with lead attachment assembly 110. The primary difference from lead attachment assembly 10 is lead attachment assembly 110 being attached to the outer surface 112 of pipe 114 with longitudinal axis A of lead fitting 120 extending longitudinally along pipe 114, and lead wire 123 also extending longitudinally along pipe 114. This allows lead attachment assembly 110 to be used on substantially any diameter pipe.

Various changes and modifications to the embodiments herein chosen for purposes of illustration will readily occur to those skilled in the art. To the extent that such modifica- Having fully described the invention in such clear and concise terms as to enable those skilled in the art to understand and practice the same, the invention claimed is:

1. A lead attachment assembly for metal pipes comprising:
   a lead fitting including an inner surface, an outer surface, and opposing ends;
   at least one magnet carried by the inner surface of the lead fitting;
   a lead wire having an end, the end of the lead wire fixed to the inner surface of the lead fitting.

2. The lead attachment assembly as claimed in claim 1 further comprising a conductive epoxy positioned on the inner surface of the lead fitting between the opposing ends for receipt against an outer surface of a pipe.

3. The lead attachment assembly as claimed in claim 1 further comprising:
   a magnet receptacle formed in the inner surface of the lead fitting; and
   the at least one magnet received in the magnet receptacle.

4. The lead attachment assembly as claimed in claim 1 further comprising:
   a lead wire receptacle formed in the inner surface of the lead fitting; and
   an end of the lead wire received in the lead wire receptacle and fix in position by a conductive solder.

5. The lead attachment assembly as claimed in claim 4 wherein the lead wire receptacle preferable extends from an edge of the lead fitting toward an opposing edge thereof.

6. The lead attachment assembly as claimed in claim 4 wherein the lead wire receptacle preferable extends from one of the opposing ends of the lead fitting toward the other of the opposing ends.

7. The lead attachment assembly as claimed in claim 1 wherein the inner surface of the lead fitting is curved to correspond to a curvature of an outer surface of a pipe.

8. The lead attachment assembly as claimed in claim 1 further comprising a placement device including:
   a pole having a handle end and an engagement end;
   a magnet element coupled to the engagement end;
   a switch coupled to the pole proximate the handle end to activate and deactivate the magnet element; and
   wherein, when activated, the magnet element holds the lead attachment assembly at the engagement end of the pole.

9. A lead attachment assembly for metal pipes comprising:
   a metal pipe having an outer surface with a curvature;
   a lead fitting including an inner surface, an outer surface, and opposing ends;
   at least one magnet carried by the inner surface of the lead fitting, the at least one magnet magnetically attached to the outer surface of the pipe;
   a lead wire fixed to the inner surface of the lead fitting and captured between the inner surface of the lead fitting and the outer surface of the pipe; and
   a conductive epoxy positioned on the inner surface of the lead fitting and contacting the outer surface of the pipe.

10. The lead attachment assembly as claimed in claim 9 wherein the inner surface of the lead fitting is curved to correspond to the curvature of the outer surface of the pipe.

11. The lead attachment assembly as claimed in claim 9 wherein the pipe is formed of a ferromagnetic material.

12. The lead attachment assembly as claimed in claim 9 further comprising:
   a magnet receptacle formed in the inner surface of the lead fitting; and
   the at least one magnet received in the magnet receptacle.

13. The lead attachment assembly as claimed in claim 9 further comprising:
   a lead wire receptacle formed in the inner surface of the lead fitting; and
   an end of the lead wire received in the lead wire receptacle and fix in position by a conductive solder.

14. The lead attachment assembly as claimed in claim 13 wherein the lead wire receptacle extends from an edge of the lead fitting toward an opposing edge thereof.

15. The lead attachment assembly as claimed in claim 13 wherein the lead wire receptacle extends from one of the opposing ends of the lead fitting toward the other of the opposing ends.

16. A method of attaching a lead wire to a pipe comprising the steps of:
   providing a metal pipe having an outer surface with a curvature;
   providing a lead attachment assembly comprising:
      a lead fitting having an inner surface, an outer surface, and opposing ends;
      at least one magnet carried by the inner surface of the lead fitting; and
      a lead wire fixed to the inner surface of the lead fitting; and
   applying an uncured conductive epoxy on the inner surface of the lead fitting;
   positioning the lead attachment assembly on the outer surface of the pipe with the uncured conductive epoxy contacting the outer surface of the pipe;
   magnetically attaching the lead attachment assembly to the outer surface of the pipe by contacting the outer surface of the pipe with the at least one magnet; and
   allowing the uncured conductive epoxy to cure while being held in place by the at least one magnet.

17. The method as claimed in claim 16 wherein the step of providing a lead attachment assembly further comprise the step of providing one of a curved between the opposing ends of the lead fitting and a curve perpendicular to the opposing ends, to correspond to the curvature of the outer surface of the pipe.

18. The method as claimed in claim 16 wherein the step of positioning the lead attachment assembly on the outer surface of the pipe further comprises the steps of:
   providing a placement device comprising:
      a pole having a handle end and an engagement end;
      a magnetic element coupled to the engagement end; and
      a switch coupled to the pole proximate the handle end to activate and deactivate the magnetic element;
   positioning the lead attachment assembly against the magnetic element;
   activating the magnetic element to magnetically engage the lead attachment assembly; and
   deactivating the magnetic element when the lead attachment assembly is positioned on the outer surface of the pipe.

* * * * *